US012709265B2

(12) United States Patent
Jo

(10) Patent No.: US 12,709,265 B2
(45) Date of Patent: Aug. 18, 2026

(54) METHOD AND SYSTEM FOR CONTROLLING VEHICLE FOR COLLISION AVOIDANCE

(71) Applicant: HL Klemove Corp., Incheon (KR)

(72) Inventor: Eunsan Jo, Pyeongtaek-si (KR)

(73) Assignee: HL Klemove Corp., Incheon (KR)

( * ) Notice: Subject to any disclaimer, the term of this patent is extended or adjusted under 35 U.S.C. 154(b) by 0 days.

(21) Appl. No.: 18/825,681

(22) Filed: Sep. 5, 2024

(65) Prior Publication Data

US 2026/0014978 A1 Jan. 15, 2026

(30) Foreign Application Priority Data

Jul. 12, 2024 (KR) ........................ 10-2024-0092431

(51) Int. Cl.

*B60W 30/09* (2012.01)
*B60W 10/18* (2012.01)
*B60W 30/095* (2012.01)
*B60W 30/16* (2020.01)
*B60W 40/08* (2012.01)
*B60W 50/14* (2020.01)

(52) U.S. Cl.

CPC ............ *B60W 30/09* (2013.01); *B60W 10/18* (2013.01); *B60W 30/0956* (2013.01); *B60W 30/16* (2013.01); *B60W 40/08* (2013.01); *B60W 50/14* (2013.01); *B60W 2040/0818* (2013.01); *B60W 2050/143* (2013.01); *B60W 2540/229* (2020.02); *B60W 2554/802* (2020.02)

(58) Field of Classification Search

CPC .. B60W 30/09; B60W 10/18; B60W 30/0956; B60W 30/16; B60W 40/08; B60W 50/14; B60W 2040/0818; B60W 2050/143; B60W 2540/229; B60W 2554/802

See application file for complete search history.

(56) References Cited

U.S. PATENT DOCUMENTS 9,472,102 B2 * 10/2016 McClain ............... B60W 30/09
11,433,862 B2 * 9/2022 Eigel ......................... B60T 7/22
11,679,762 B2 * 6/2023 Lee .................. B60W 30/0956 701/26
11,977,147 B2 * 5/2024 Song ..................... G01S 17/931
12,217,606 B1 * 2/2025 Cheng .................... G08G 1/166
2014/0142798 A1 * 5/2014 Guarnizo Martinez . G08G 1/16 701/23

(Continued)

FOREIGN PATENT DOCUMENTS

DE 102013211278 B4 * 4/2021 ............... B60Q 9/00

*Primary Examiner* — Babar Sarwar

(74) *Attorney, Agent, or Firm* — Studebaker Brackett PLLC

(57) ABSTRACT

A method and a system for controlling an electric bicycle are provided, and the method for controlling a vehicle for collision avoidance according to an embodiment of the present disclosure comprises: recognizing a front vehicle ahead of an ego vehicle; determining a collision risk between the ego vehicle and the front vehicle; determining a degree of a driver's attentiveness of the ego vehicle; determining whether deceleration of the ego vehicle is required; determining whether the collision risk, the degree of the driver's attentiveness, and whether the deceleration is required satisfy predetermined conditions; and if said predetermined conditions are satisfied, operating a driver assistance function.

12 Claims, 5 Drawing Sheets

(56) References Cited

U.S. PATENT DOCUMENTS

| | | | | |
|---|---|---|---|---|
| 2017/0101093 | A1* | 4/2017 | Barfield, Jr. | G08G 1/09675 |
| 2019/0329744 | A1* | 10/2019 | Kim | B60T 8/58 |
| 2020/0122773 | A1* | 4/2020 | Deshpande | B60T 7/12 |
| 2020/0247398 | A1* | 8/2020 | Miyamoto | G01S 13/58 |
| 2020/0262424 | A1* | 8/2020 | Kong | G05D 1/0212 |
| 2020/0290607 | A1* | 9/2020 | Mielenz | B60W 30/09 |
| 2020/0391734 | A1* | 12/2020 | Jung | B60W 10/30 |
| 2021/0046822 | A1* | 2/2021 | Kleen | B60W 50/14 |
| 2022/0097661 | A1* | 3/2022 | Meng | G06V 20/58 |
| 2022/0203995 | A1* | 6/2022 | MacKenzie | B60W 30/09 |
| 2022/0204035 | A1* | 6/2022 | MacKenzie | B60W 50/14 |
| 2023/0242138 | A1* | 8/2023 | Choi | B60W 40/10<br>701/117 |
| 2023/0398984 | A1* | 12/2023 | Kim | B60W 50/14 |

* cited by examiner

METHOD AND SYSTEM FOR CONTROLLING VEHICLE FOR COLLISION AVOIDANCE

CROSS-REFERENCE TO RELATED APPLICATION

This application claims the benefit of and priority to Korean Patent Application No. 10-2024-0092431 filed on Jul. 12, 2024, the entire disclosures of which are incorporated herein by reference.

TECHNICAL FIELD

The present disclosure relates to a method and system for controlling a vehicle for collision avoidance. More specifically, the present disclosure relates to a method and system for controlling a vehicle for collision avoidance that preemptively controls the vehicle through a collision risk prediction to assist the driver and notify the driver of the collision risk.

BACKGROUND

In a vehicle, a driver assistance system provides assistance to the driver while driving in the vehicle for the driver's convenience.

For example, the Autonomous Emergency Braking System (AEB) refers to a function that reduces the collision risk by automatically braking when the vehicle detects the risk of a forward collision.

On the other hand, in case that a vehicle is driving at a high speed, it takes more time for the vehicle to stop, making it difficult to completely prevent the collision with the vehicle in front.

Meanwhile, when adjusting the sensitivity of the AEB system in high-speed driving situations, there is a problem that the driver's driving convenience is reduced due to sudden braking and the collision risk with the rear vehicle increases.

Therefore, there is a need for a method and system for controlling the vehicle for collision avoidance that can increase driver convenience and driving safety in a situation where there is a collision risk with the front vehicle.

SUMMARY

The present disclosure is to solve the above-mentioned problems of the prior art, and the object of the present disclosure is to provide a method and system for controlling a vehicle for collision avoidance that can prevent collision with the front vehicle by preemptive braking through risk prediction and can increase driver convenience by a smaller braking amount compared to the autonomous emergency braking system (AEB).

Further, the object of the present disclosure is to provide a method and system for controlling a vehicle for collision avoidance that can reduce the risk of rear-end vehicle collision and minimize changes to hardware and software by designing the system by combining the existing AEB function and the existing cruise control function.

However, the technical problem to be achieved by the embodiments of the present disclosure is not limited to the technical problems described above, and other technical problems may exist.

As a technical means for achieving the above technical problem, a method for controlling a vehicle for collision avoidance according to an embodiment of the present disclosure comprises: recognizing a front vehicle ahead of an ego vehicle; determining a collision risk between the ego vehicle and the front vehicle; determining a degree of a driver's attentiveness of the ego vehicle; determining whether deceleration of the ego vehicle is required; determining whether the collision risk, the degree of the driver's attentiveness, and whether the deceleration is required satisfy predetermined conditions; and if said predetermined conditions are satisfied, operating a driver assistance function.

Further, the driver assistance function operated in the operating of the driver assistance function may be a cruise control function.

Further, the operating of the driver assistance function may be performed before an autonomous emergency braking function provided in the ego vehicle is operated.

Further, the operating of the driver assistance function may further comprise issuing an alarm to warn the driver of the ego vehicle of the collision risk.

Further, the collision risk determined in the determining of the collision risk may be calculated by calculating a safe distance distribution between the ego vehicle and the front vehicle, and the percentage of which the ego vehicle invades the safe distance distribution.

Further, in the determining of whether the deceleration is required, it may be determined that the deceleration is required based on whether the deceleration is required to maintain a distance between the ego vehicle and the front vehicle to a predetermined distance.

Further, the determining of the degree of the driver's inattentiveness may determine the degree of the driver's inattentiveness based on at least one of whether the driver's hands are off, whether the driver is keeping eyes forward, or the driver's driving pattern.

Further, in the operating of the driver assistance function, the driver assistance function may be operated if it is determined that the collision risk is greater than a predetermined first threshold value, the degree of the driver's inattentiveness is greater than a predetermined second threshold value, and the deceleration of the ego vehicle is required.

Further, if the cruise control function is in operation, the condition for releasing the cruise control function may be deactivated if the collision risk, the degree of the driver's inattentiveness, and whether the deceleration of the ego vehicle is required satisfy predetermined conditions.

Further, if the cruise control function is in operation, if the driver is not controlling the ego vehicle for a predetermined time, the cruise control function may be released.

A system for controlling a vehicle for collision avoidance according to the embodiments of the present disclosure comprises: a first sensor configured to detect a front vehicle ahead of an ego vehicle; a second sensor configured to detect a status of a driver of the ego vehicle; a third sensor configured to detect body information of the ego vehicle; a controller comprising at least one processor configured to determine a collision risk between the ego vehicle and the front vehicle, a degree of a driver's inattentiveness of the ego vehicle, and whether deceleration of the ego vehicle is required, based on detection results of the first sensor, the second sensor and the third sensor; a braking apparatus configured to control a longitudinal driving of the ego vehicle; and a steering apparatus configured to control a lateral driving of the ego vehicle, wherein the controller is configured to control at least one of the braking apparatus and the steering apparatus to operate a driver assistance function, if the collision risk, degree of the driver's inattentiveness, and whether deceleration of the ego vehicle is required determined by the at least one processor satisfy predetermined conditions.

Further, the driver assistance function may be a cruise control function.

Further, the controller may be configured to control the operation of the driver assistance function to be performed before the autonomous emergency braking function provided in the ego vehicle is operated.

Further, the system may further comprise a warning apparatus configured to issue an alarm to warn the driver of the ego vehicle of the collision risk.

Further, the collision risk determined by the controller may be calculated by calculating a safe distance distribution between the ego vehicle and the front vehicle, and by calculating a percentage of which the ego vehicle invades the safe distance distribution.

Further, the controller may be configured to determine whether the deceleration is required based on whether the deceleration is required to maintain a distance between the ego vehicle and the front vehicle to a predetermined distance.

Further, the controller may be configured to determine the degree of the driver's inattentiveness based on at least one of whether the driver's hands are off, whether the driver is keeping eyes forward, and the driver's driving pattern.

Further, the controller may be configured to operate the driver assistance function if it is determined that the collision risk is greater than a predetermined first threshold value, the degree of the driver's inattentiveness is greater than a predetermined second threshold value, and the deceleration of the ego vehicle is required.

Further, the warning apparatus may comprise at least one of a visual alarm device, an audible alarm device, or a haptic alarm device.

Further, the first sensor may comprise at least one of a front camera and a front radar, the second sensor may comprise a driver monitoring camera, and the third sensor may comprise a steering torque sensor.

The above-described means for solving the problem is only exemplary and should not be construed as limiting the present disclosure. In addition to the exemplary embodiments described above, additional embodiments may exist in the drawings and the following detailed description.

According to the above-described problem-solving means of the present disclosure, it is possible to provide a method and system for controlling a vehicle for collision avoidance that can prevent collisions with the front vehicle through preemptive braking and increase driver convenience.

In addition, according to the above-described problem-solving means of the present disclosure, it is possible to provide a method and system for controlling a vehicle for collision avoidance that can reduce a risk of rear-end collision by applying a gradual braking while maintaining a distance from the front vehicle when a collision risk is predicted, rather than a sudden braking when a collision is imminent.

However, the effects obtainable from the present disclosure are not limited to the effects described above, and other effects may exist.

DETAILED DESCRIPTION

Figure 1:
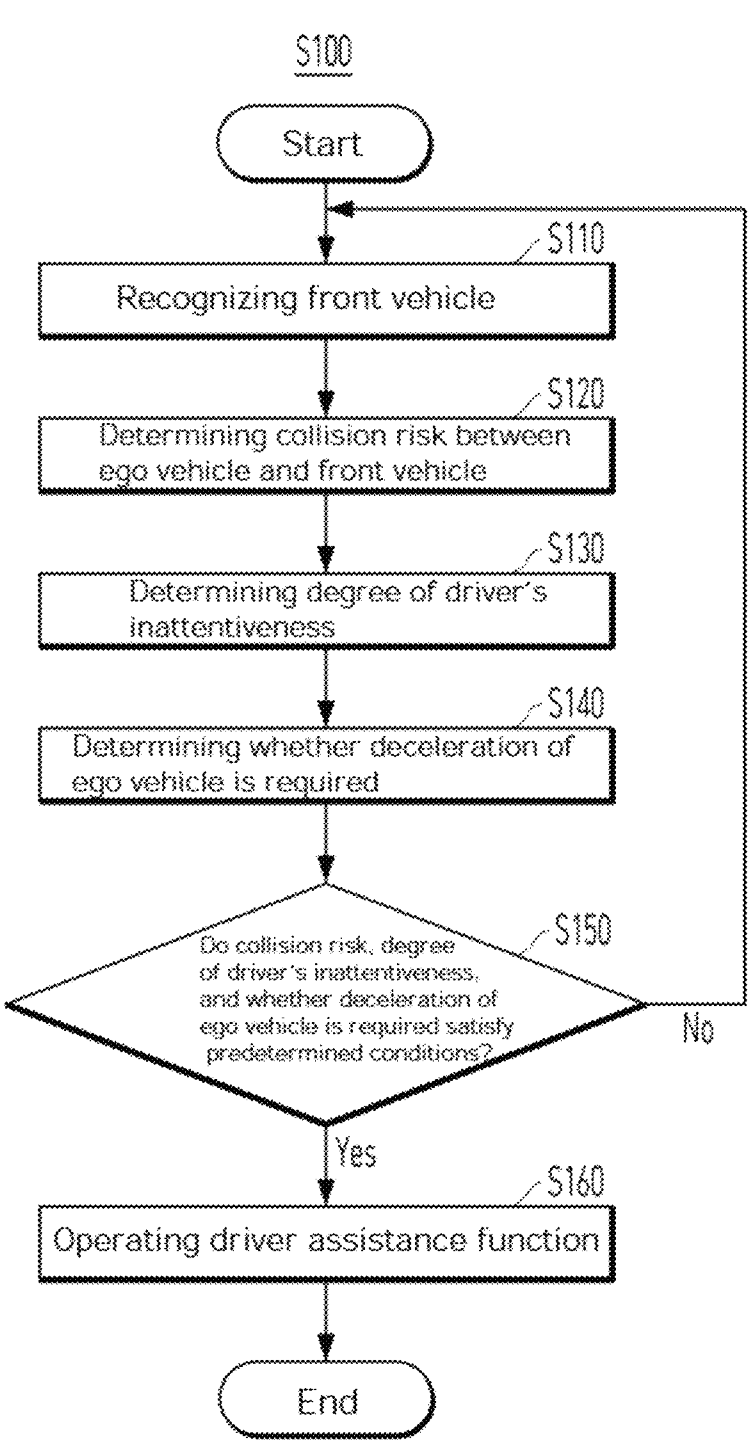
FIG. 1 is a control flowchart showing a method for controlling a vehicle for collision avoidance according to an embodiment of the present disclosure.

Hereinafter, with reference to the accompanying drawings, embodiments of the present disclosure will be described in detail so that those skilled in the art can easily practice the embodiments. However, the present disclosure may be implemented in many different forms and is not limited to the embodiments described herein. In addition, in order to clearly describe the present disclosure in the drawings, parts irrelevant to the description are omitted, and similar reference numerals are attached to similar parts throughout the present disclosure.

Throughout the present disclosure, if a part is said to be "connected" to another part, it is not only "directly connected", but also "electrically connected" with another element in between, including cases where they are "indirectly connected".

Throughout the present disclosure, if one member is said to be located "on", "above", "under", or "below" the other member, this includes not only the case of being in contact with the other member, but also the case that another member is positioned between the two members.

Throughout the present disclosure, if a part "includes" a certain component, it does not mean excluding other components, and it does mean that it may further include other components, unless otherwise stated.

Various embodiments of the present disclosure generally relate to a method and system for controlling a vehicle for collision avoidance that can prevent a collision with a front vehicle through preemptive braking and at the same time can reduce the risk of a rear-end collision.

FIG. 1 is a control flowchart showing a method for controlling a vehicle for collision avoidance according to an embodiment of the present disclosure.

Referring to FIG. 1 of the present disclosure, a method for controlling a vehicle for collision avoidance S100 according to an embodiment of the present disclosure may include a step of recognizing a front vehicle ahead of an ego vehicle (a host vehicle) S110. For example, the front vehicle may be recognized by a front camera and/or a front radar installed at the ego vehicle.

Next, a step of determining the collision risk between the ego vehicle and the front vehicle S120 may be performed. For example, the collision risk between the ego vehicle and the front vehicle may be determined by calculating a safety distance distribution in consideration of interaction and uncertainty between the front vehicle and the ego vehicle, and calculating the percentage of which the ego vehicle invades the calculated safety distance distribution.

The method for calculating the safe distance distribution and the method for calculating the collision risk according to the embodiment of the present disclosure will be explained in more detail in the description of FIG. 2.

Next, the step of determining the degree of the driver's inattentiveness S130 may be performed to determine the degree of the driver's inattentiveness.

Here, the degree of the driver's inattentiveness may be determined based on at least one of whether the driver's hands are off, whether the driver is keeping the eyes forward, or the driver's driving pattern.

For example, it may be determined whether the driver's hands are off or not by using a steering torque sensor installed at the ego vehicle. Here, the hands-off value regarding whether the driver's hands are off may be determined to be a value between 0 and 1 depending upon the value of the steering torque sensor. That is, if the driver completely removes his hands from the steering wheel, the driver's hands-off value f1 may have a value of 1.

Further, whether the driver is keeping the eyes forward can be determined using, for example, a driver monitoring camera (In-cabin monitoring camera). For example, when the driver is keeping the eyes exactly forward, the driver's forward gazing rate (forward gazing value) may be determined to be 0, and this driver's forward gazing rate f2 may have a value between 0 and 1.

Further, the driver's driving pattern may be determined by recognizing the vehicle's driving pattern through the driver's control of the steering wheel. For example, if it is determined that the vehicle is not driving normally, such as when the driver is driving out of the lane, the driver's driving pattern value may be determined to be higher. The driver's driving pattern value f3 may also have a value between 0 and 1.

Meanwhile, by setting weights for the driver's hands-off value, driver's forward gazing rate (the driver's forward gazing value), and driver's driving pattern value, the finally determined degree of the driver's inattentiveness may be calculated as (w1*f1+w2*f2+w3*f3)/(w1+w2+w3).

Here, the sum of w1, w2 and w3 may be 1. For example, it may be set as w1=w2=w3=⅓, but it is not limited thereto, and if the sum of w1, w2 and w3 is 1, at least one of the values may be set to 0.

After determining the degree of driver's inattentiveness, a step of determining whether the deceleration of the ego vehicle is required S140 may be performed.

Whether the deceleration of the ego vehicle is required may be determined, for example, by the required acceleration according to the cruise control function of the driver assistance system. This cruise control function may also be called as Active Cruise Control (ACC), Adaptive Cruise Control (Adaptive Cruise Control), Smart Cruise Control (SCC), Advanced Smart Cruise Control, or Dynamic Radar Cruise Control (DRCC).

For example, if the cruise control function is operated, the distance between the ego vehicle and the front vehicle is controlled to maintain a predetermined distance. In the step of determining whether the deceleration is required S140, it may be determined that the deceleration of the ego vehicle is required if the deceleration is necessary in order to maintain the distance between the ego vehicle and the front vehicle to a predetermined distance.

Next, a step of determining whether the collision risk between the ego vehicle and the front vehicle, the degree of the driver's inattentiveness, and whether the deceleration of the ego vehicle is required, which are determined in S120 to S140, satisfy predetermined conditions may be performed (S150).

On the other hand, if the predetermined conditions are satisfied in S150 ('Yes' in S150), the driver assistance function may be controlled to be operated (S160), and if the predetermined conditions are not satisfied in S150 ('No' in S150), it may return to the step of recognizing the front vehicle S110.

Here, the driver assistance function operated in the step of operating the driver assistance function S160 may be the cruise control function as described above.

Further, the operation of the cruise control function may be performed before the autonomous emergency braking (AEB) function of the driver assistance system installed at the vehicle is operated. That is, by activating the cruise control function before braking according to the autonomous emergency braking function, braking (deceleration) according to the cruise control function can be performed first.

In addition, according to the method for controlling the vehicle for collision avoidance according to the embodiment of the present disclosure, in addition to operating the cruise control function, the step of issuing an alarm to warn the driver of the ego vehicle of the risk of a forward collision may be further performed.

According to the method for controlling the vehicle for collision avoidance according to the embodiment of the present disclosure as described above, a collision with the front vehicle can be prevented while preventing a sudden braking, by preemptive braking according to the cruise control with a smaller braking amount than AEB before the AEB function is operated, resulting in improvement of the driver's convenience.

In addition, according to the method of controlling the vehicle for collision avoidance according to the embodiment of the present disclosure, it is possible to design a collision avoidance system by combining the existing AEB function and the cruise control function, thereby minimizing changes in hardware and software.

Figure 2:
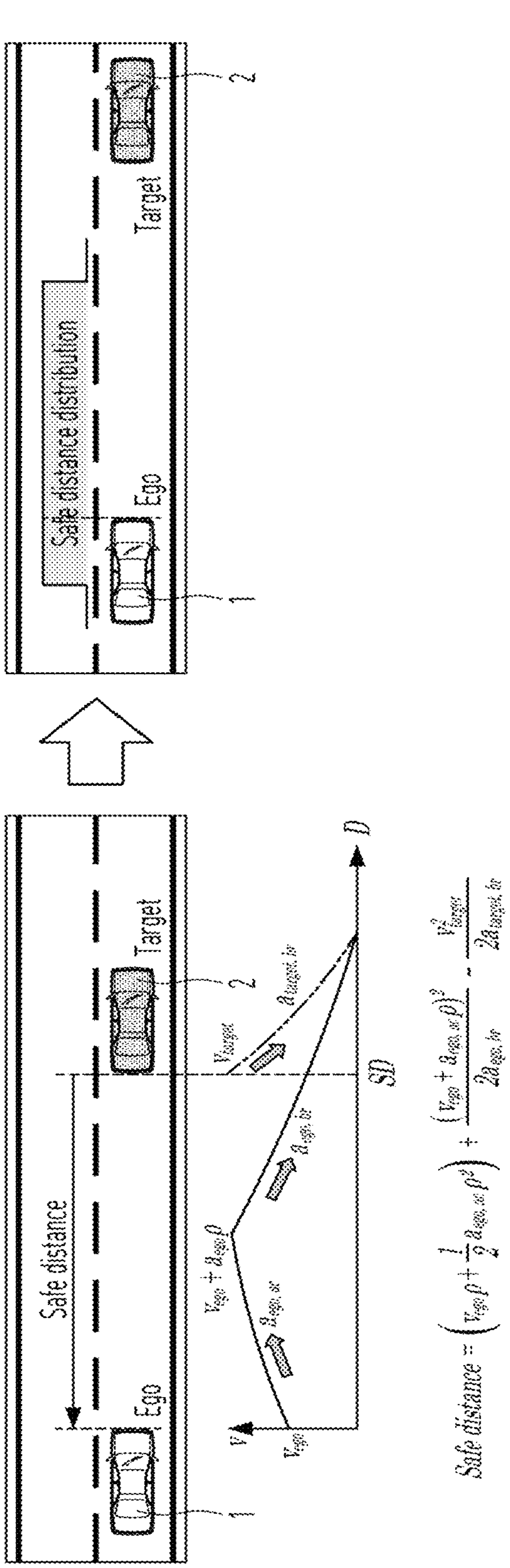
FIG. 2 is a diagram showing a method of calculating a collision safe distance distribution in consideration of interaction and uncertainty in the method for controlling the vehicle for collision avoidance according to the embodiment of the present disclosure.

FIG. 2 is a diagram showing a method of calculating a collision safe distance distribution in consideration of interaction and uncertainty in the method for controlling the vehicle for collision avoidance according to the embodiment of the present disclosure.

In FIG. 2, the speed of the ego vehicle 1 may be expressed as $v_{ego}$, and the speed of the front vehicle (target vehicle) 2 may be expressed as $v_{target}$.

Further, referring to FIG. 2, the ego vehicle 1 may accelerate rapidly until the ego vehicle 1 recognizes the front vehicle 2, and the acceleration of the ego vehicle 1 at this time may be expressed as $a_{ego,ac}$. On the other hand, if the front vehicle 2 suddenly decelerates, there may be a collision risk between the ego vehicle 1 and the front vehicle 2, and in this case, the deceleration of the front vehicle 2 according to the sudden braking may be expressed as $a_{target,br}$, and the deceleration of the ego vehicle 1 in response to the sudden braking of the front vehicle 2 may be expressed as $a_{ego,br}$.

Further, if the reaction time in which the driver of the ego vehicle 1 recognizes the collision risk with the front vehicle and starts to react is expressed as $\rho$, the ego vehicle may be accelerated until the reaction time $\rho$ is passed.

Therefore, the distance calculated by subtracting the moving distance (braking distance) due to the deceleration of the front vehicle, after adding the moving distance due to the acceleration of the ego vehicle before the driver of the ego vehicle starts to react $$\left(\left(v_{ego}\rho+\frac{1}{2}a_{ego,ar}\rho^2\right)\right),$$

with the moving distance (braking distance) due to the deceleration of the ego vehicle after the driver stats to react in response to the deceleration of the front vehicle $$\left(\frac{(v_{ego}+a_{ego,ar}\rho)^2}{2a_{ego,br}}\right),$$

may be set as the safe distance (SD) between the ego vehicle and the front vehicle.

That is, the safe distance between the ego vehicle and the front vehicle may be expressed by the following equation.

[Equation 1]

$$\text{Safe distance} = \left(v_{ego}\rho+\frac{1}{2}a_{ego,ar}\rho^2\right)+\frac{(v_{ego}+a_{ego,ar}\rho)^2}{2a_{ego,br}}-\frac{v_{target}^2}{2a_{target,br}}$$

Meanwhile, since $a_{target,br}$, $a_{ego,ac}$, and ρ are uncertain values, each value may be set as a distribution. For example, $a_{target,br}$ may be set to a uniform distribution between −3 m/s$^2$ and 0 m/s$^2$, $a_{ego,ac}$ may be set to a uniform distribution between 0 m/s$^2$ and 1 m/s$^2$, and ρ may be set to a uniform distribution between 0.5 seconds(s) and 2 seconds(s). The safe distance value calculated in this way may have a uniform distribution, forming a safe distance distribution as shown on the right side of FIG. 2.

Figure 3:
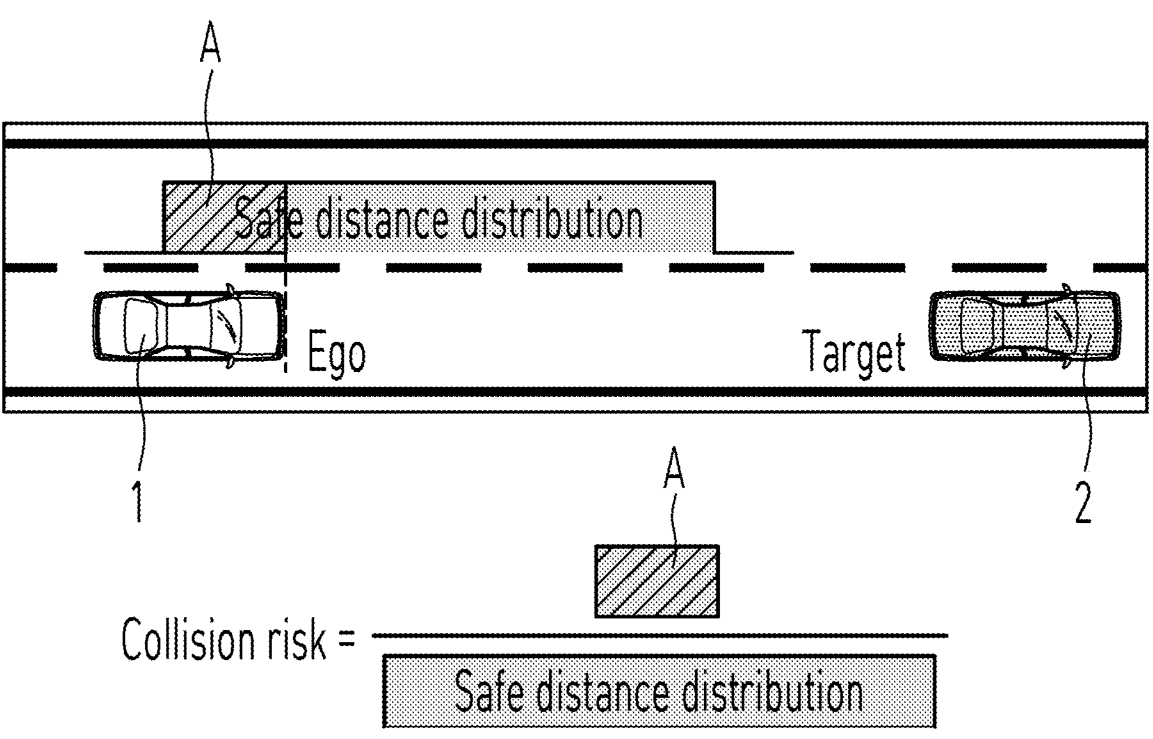
FIG. 3 is a diagram showing a method of probabilistically calculating a collision risk using a safety distance distribution in the method for controlling the vehicle for collision avoidance according to the embodiment of the present disclosure.

FIG. 3 is a diagram showing a method of probabilistically calculating a collision risk using a safety distance distribution in the method for controlling the vehicle for collision avoidance according to the embodiment of the present disclosure.

As shown in FIG. 2, if the calculated safe distance distribution is set as the denominator and the area where the ego vehicle 1 invades the safe distance distribution is set as the numerator, it may be determined that what percentage of the safe distance distribution area is invaded by the ego vehicle 1.

For example, as shown in FIG. 3, the ratio of the invasion area A of the ego vehicle 1 to the area of the safe distance distribution may be determined as the collision risk. Accordingly, the collision risk may have a value ranging from 0 to 1.

If calculating the collision risk probabilistically using the method shown in FIGS. 2 and 3, compared to the method using the existing Time To Collision (TTC), it is possible to consider the increase of the risk due to uncertainties such as the sudden deceleration of the front vehicle, the sudden acceleration of the ego vehicle, and the reaction time of the ego vehicle.

In addition, if calculating the collision risk probabilistically using the method shown in FIGS. 2 and 3, the deceleration of the ego vehicle due to the rapid deceleration of the front vehicle, i.e., the changes in the driving state of the ego vehicle due to the interaction between the ego vehicle and the front vehicle can be considered.

Moreover, since the collision risk can be estimated probabilistically by calculating the degree of invasion of the safe distance distribution, it is advantageous that it is relatively insensitive to noise compared to the method using TTC.

Figure 4:
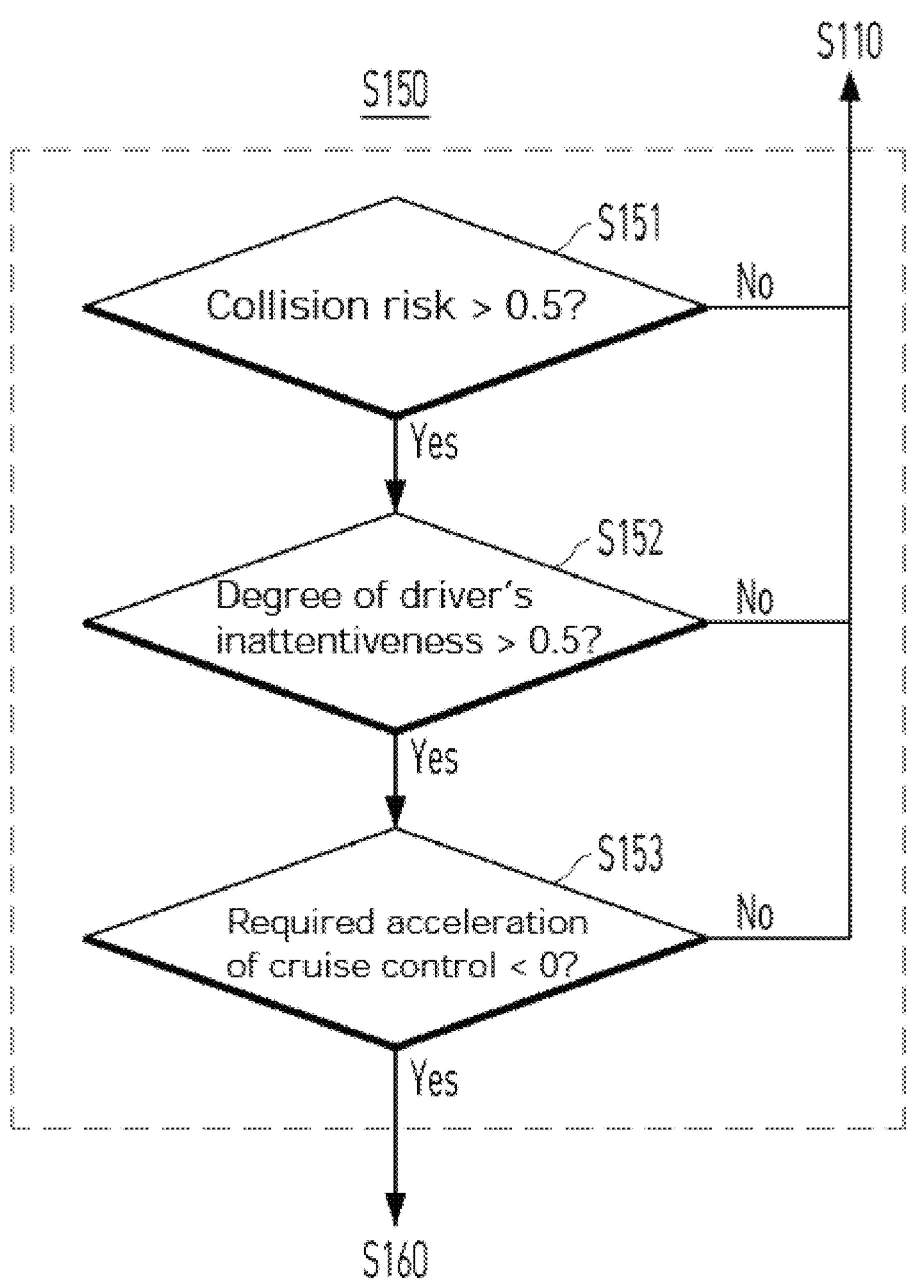
FIG. 4 is a control flowchart showing in more detail an embodiment of determining whether predetermined conditions are satisfied in the method for controlling the vehicle for collision avoidance according to the embodiment of the present disclosure.

FIG. 4 is a control flowchart showing in more detail an embodiment of determining whether predetermined conditions are satisfied in the method for controlling the vehicle for collision avoidance according to the embodiment of the present disclosure.

Referring to FIG. 4, in the method for controlling the vehicle for collision avoidance according to the embodiment of the present disclosure, the step of determining whether the predetermined condition is satisfied S150 may comprise a step of determining whether the collision risk calculated by the method described in FIGS. 2 and 3 is greater than a predetermined first threshold value (S151). Here, the predetermined first threshold value may be, for example, 0.5. However, the present disclosure is not limited thereto, and the predetermined first threshold value may be a parameter value set differently as needed.

If the collision risk is equal to or less than the predetermined first threshold value in S151 ('No' in S151), it may be return to the step of recognizing the front vehicle S110. If the collision risk is greater than the predetermined first threshold value ('Yes' in S151), it may proceed to the step of determining whether the degree of the driver's inattentiveness is greater than a predetermined second threshold value S152. Here, the predetermined second threshold value may be, for example, 0.5. However, the present disclosure is not limited thereto, and the predetermined second threshold value may be a parameter value set differently as needed.

If the degree of the driver's inattentiveness is equal to or less than the predetermined second threshold value in S152 ('No' in S152), it may return to the step of recognizing the front vehicle S110. If the degree of the driver's inattentiveness is greater than the predetermined second threshold value in S152 ('Yes' in S152), the process may proceed to the step of determining whether the deceleration of the ego vehicle is required, for example, whether the required acceleration of the cruise control is less than 0 (S153).

Here, if the required acceleration of the cruise control is 0 or greater ('No' in S153), it may return to the step of recognizing the front vehicle S110, and if the required acceleration of the cruise control is less than 0 ('Yes' in S153), for example, a step of operating the driver assistance function S160 for operating the cruise control function may be performed.

In addition, with respect to the step of operating the driver assistance function S160, if the cruise control function is already in operation, if the collision risk, the degree of the driver's inattentiveness, and whether the deceleration is required satisfy the above predetermined conditions, the condition for releasing the cruise control function may be deactivated.

For example, in the normal cruise control function, the cruise control function may be released when the driver performs accelerator override. However, according to the embodiment of the present disclosure, since there is a collision risk with the front vehicle if predetermined conditions are satisfied, by deactivating the release of the cruise control function by the accelerator override it is possible to promote safer driving by preventing the cruise control function from being released.

On the other hand, since operating the driver assistance function (cruise control function) as described above corresponds to handing over the control to the system, if the driver does not control the ego vehicle (the driver does not respond) for a predetermined time (for example, 5 seconds), the activated cruise control function may be deactivated again. This is because the operation of the driver assistance function according to the embodiment of the present disclosure may be performed for the purpose of assisting the driver rather than fully autonomous driving.

In this way, according to the method for controlling the vehicle for collision avoidance according to the embodiment of the present disclosure, by operating the driver assistance function, e.g., the cruise control function in consideration of the collision risk between the ego vehicle and the front vehicle, the degree of the inattentiveness of the driver of the ego vehicle, and whether the deceleration is required according to the cruise control function, it is possible to provide preemptive braking of the vehicle and collision risk notification to the driver through system operation without causing inconvenience to the driver before the AEB function is operated.

Figure 5:
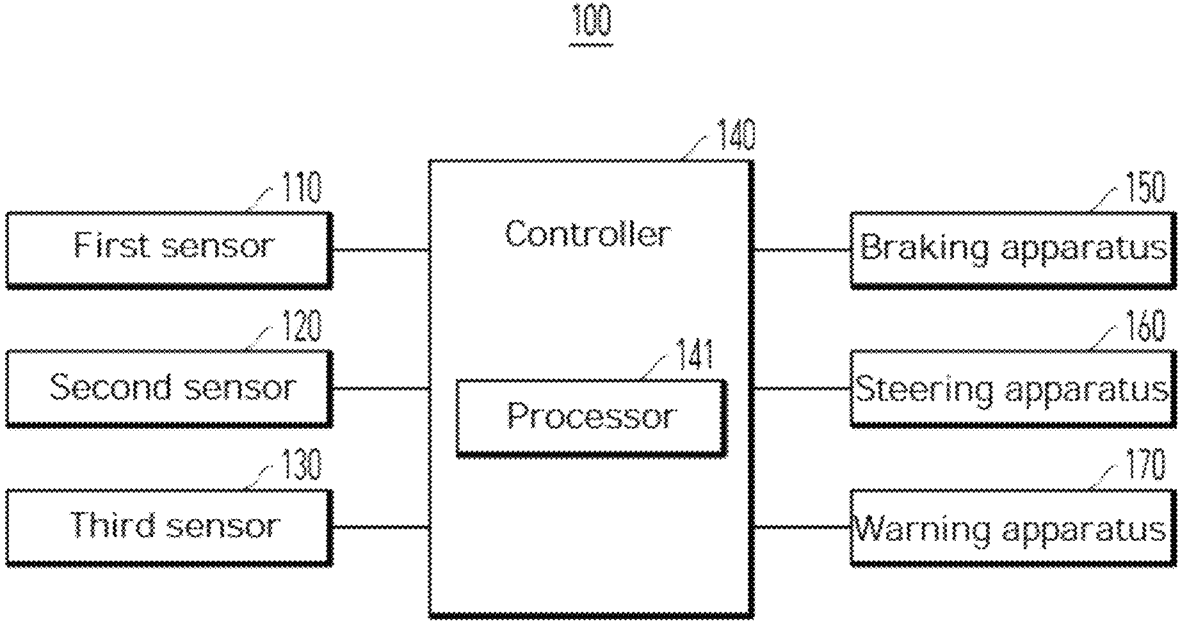
FIG. 5 is a control configuration diagram schematically showing the configuration of a system for controlling a vehicle for collision avoidance according to embodiments of the present disclosure.

FIG. 5 is a control configuration diagram schematically showing the configuration of a system for controlling a vehicle for collision avoidance according to embodiments of the present disclosure.

Referring to FIG. 5, the system for controlling the vehicle for collision avoidance 100 according to the embodiment of the present disclosure may comprise a first sensor 110 configured to detect a vehicle in front of the ego vehicle, a second sensor 120 configured to detect the status of the driver of the ego vehicle, a the third sensor 130 configured to detect vehicle body information of the ego vehicle, and a controller 140 comprising at least one processor 141 configure to determine the collision risk between the ego vehicle and the front vehicle, the degree of inattentiveness of the driver of the ego vehicle, and whether the deceleration of the ego vehicle is required, based on the detection results of the first sensor 110 to the third sensor 130.

Further, the system for controlling the vehicle for collision avoidance 100 according to the embodiment of the present disclosure may comprise a braking apparatus 150 configured to control the longitudinal driving of the ego vehicle and a steering apparatus 160 configured to control the lateral driving of the ego vehicle.

Further, if the collision risk, the degree of the driver's inattention, and whether the deceleration of the ego vehicle is required, determined by at least one processor 141, satisfy predetermined conditions, the controller 140 may control at least one of the braking apparatus 150 and the steering apparatus 160 to operate the driver assistance function.

In addition, the driver assistance function operated by the controller 140 may be a cruise control function, and the controller 140 may operate the driver assistance function (cruise control function) before the autonomous emergency braking function provided in the vehicle is operated.

Since the specific method for controlling the vehicle according to the embodiments of the present disclosure performed by the controller 140 has been described in detail previously, the detailed description will be omitted here.

The first sensor 110 may include at least one of a front camera and a front radar. However, it is not limited thereto, and may include other types of sensors for detecting the surroundings of the vehicle, such as corner radar, ultrasonic sensor, and lidar sensor.

The second sensor 120 may include a driver monitoring camera (In cabin monitoring camera). However, it is not limited thereto, and may include other types of sensors as long as they can detect the driver's status.

The third sensor 130 may include a speed sensor, an acceleration sensor, and/or a steering torque sensor for detecting body information of the ego vehicle. By those sensors, body information such as speed, acceleration, and steering torque of the ego vehicle on driving may be detected. The body information detected in this way may be used, for example, to determine the degree of the driver's inattentiveness (hands off, driving pattern of driver, etc.), and may also be used to determine the collision risk between the ego vehicle and the front vehicle.

Meanwhile, the controller 140 according to the embodiments of the present disclosure may be connected to a braking apparatus 150 configured to control the longitudinal driving of the ego vehicle and a steering apparatus 160 configured to control the lateral driving of the ego vehicle. Accordingly, when operating the driver assistance function (for example, the cruise control function), the driving of the ego vehicle may be controlled by controlling the braking apparatus 150 and the steering apparatus 160.

In addition, the system for controlling the vehicle for collision avoidance 100 according to embodiments of the present disclosure may further include a warning apparatus 170 configured to issue an alarm to warn the driver of the ego vehicle of the collision risk.

This warning apparatus may include at least one of a visual alarm device, an audible alarm device, and a haptic alarm device, thereby alerting that there is a collision risk with the front vehicle through a visual alarm, an audible alarm, and/or a haptic alarm.

According to the embodiments of the present disclosure as described above, the collision risk is probabilistically determined considering the interaction and the uncertainty, and the driver assistance function is operated based on the collision risk, the degree of driver's inattentiveness, and whether the deceleration is required. Accordingly, it is possible to provide a method and system for controlling the vehicle for collision avoidance that can improve driver convenience through preemptive braking and can effectively prevent the risk of the rear-end collision.

Moreover, according to the embodiments of the present disclosure, since it can be applied to vehicles with the existing driver assistance functions such as the autonomous emergency braking system and the cruise control system, it is possible to provide a driver assistance system capable of increasing driver convenience while minimizing changes to the hardware and the software.

The above description of the present disclosure is for illustrative purposes, and those skilled in the art may understand that it can be easily modified into other specific forms without changing the technical spirit or essential features of the present disclosure. Therefore, the embodiments described above should be understood as illustrative in all respects and not limiting. For example, each component described as a single type may be implemented in a distributed manner, and similarly, components described as distributed may be implemented in a combined form.

The scope of the present disclosure is indicated by the following claims rather than the above detailed description, and all changes or modifications derived from the meaning and scope of the claims and equivalent concepts should be interpreted to be included in the scope of the present disclosure.

EXPLANATION OF REFERENCE

1: Ego vehicle
2: Front vehicle
100: System for controlling vehicle for collision avoidance
110: First sensor
120: Second sensor
130: Third sensor
140: Controller

141: Processor
150: Braking apparatus
160: Steering apparatus
170: Warning apparatus

What is claimed is:

1. A method for controlling a vehicle for collision avoidance, comprising:

recognizing a front vehicle ahead of an ego vehicle;

determining whether a collision risk between the ego vehicle and the front vehicle is greater than a predetermined first threshold value;

determining whether a degree of a driver's attentiveness of the ego vehicle is greater than a predetermined second threshold value;

determining whether deceleration of the ego vehicle is required to maintain a distance between the ego vehicle and the front vehicle to a predetermined distance; and when the collision risk is greater than the predetermined first threshold value, the degree of the driver's attentiveness is greater than the predetermined second threshold value, and the deceleration of the ego vehicle is required to maintain the distance to the predetermined distance, operating a cruise control function as a driver assistance function, wherein the operating of the cruise control function is performed before an autonomous emergency braking function provided in the ego vehicle is operated.

2. The method of claim 1, wherein the operating of the cruise control function further comprises issuing an alarm to warn the driver of the ego vehicle of the collision risk.

3. The method of claim 1, wherein the collision risk determined in the determining of the collision risk is calculated by calculating a safe distance distribution between the ego vehicle and the front vehicle, and the percentage of which the ego vehicle invades the safe distance distribution.

4. The method of claim 3, wherein the determining of the degree of the driver's inattentiveness determines the degree of the driver's inattentiveness based on at least one of whether the driver's hands are off, whether the driver is keeping eyes forward, or the driver's driving pattern.

5. The method of claim 1, wherein when the cruise control function is in operation, the condition for releasing the cruise control function is deactivated when the collision risk, the degree of the driver's inattentiveness, and whether the deceleration of the ego vehicle is required satisfy predetermined conditions.

6. The method of claim 5, wherein when the cruise control function is in operation, when the driver is not controlling the ego vehicle for a predetermined time, the cruise control function is released.

7. A system for controlling a vehicle for collision avoidance, comprising:

a first sensor configured to detect a front vehicle ahead of an ego vehicle;

a second sensor configured to detect a status of a driver of the ego vehicle;

a third sensor configured to detect body information of the ego vehicle;

a controller comprising at least one processor configured to determine a collision risk between the ego vehicle and the front vehicle, a degree of a driver's inattentiveness of the ego vehicle, and whether deceleration of the ego vehicle is required, based on detection results of the first sensor, the second sensor and the third sensor;

a braking apparatus configured to control a longitudinal driving of the ego vehicle; and a steering apparatus configured to control a lateral driving of the ego vehicle, wherein the controller is configured to control at least one of the braking apparatus and the steering apparatus to operate a cruise control function as a driver assistance function, when the collision risk is greater than a predetermined first threshold value, the degree of the driver's attentiveness is greater than a predetermined second threshold value, and the deceleration of the ego vehicle is required to maintain a distance between the ego vehicle and the front vehicle to a predetermined distance, wherein the controller is configured to control the operation of the cruise control function to be performed before the autonomous emergency braking function provided in the ego vehicle is operated.

8. The system of claim 7, further comprising a warning apparatus configured to issue an alarm to warn the driver of the ego vehicle of the collision risk.

9. The system of claim 8, wherein the warning apparatus comprises at least one of a visual alarm device, an audible alarm device, or a haptic alarm device.

10. The system of claim 7, wherein the collision risk determined by the controller is calculated by calculating a safe distance distribution between the ego vehicle and the front vehicle, and by calculating a percentage of which the ego vehicle invades the safe distance distribution.

11. The system of claim 10, wherein the controller is configured to determine the degree of the driver's inattentiveness based on at least one of whether the driver's hands are off, whether the driver is keeping eyes forward, and the driver's driving pattern.

12. The system of claim 7, wherein the first sensor comprises at least one of a front camera and a front radar, the second sensor comprises a driver monitoring camera, and the third sensor comprises a steering torque sensor.

* * * * *